US009758259B2

(12) United States Patent
Schoen

(10) Patent No.: US 9,758,259 B2
(45) Date of Patent: Sep. 12, 2017

(54) EXTERIOR AIRCRAFT LIGHT UNIT AND METHOD OF OPERATING AN EXTERIOR AIRCRAFT LIGHT UNIT

(71) Applicant: Goodrich Lighting Systems GmbH, Lippstadt (DE)

(72) Inventor: Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 369 days.

(21) Appl. No.: 14/338,364

(22) Filed: Jul. 23, 2014

(65) Prior Publication Data

US 2015/0036366 A1 Feb. 5, 2015

(30) Foreign Application Priority Data

Jul. 30, 2013 (EP) ..................................... 13178586

(51) Int. Cl.
*B64D 7/02* (2006.01)
*B64D 47/02* (2006.01)

(52) U.S. Cl.
CPC .................................. *B64D 47/02* (2013.01)

(58) Field of Classification Search
CPC .............................. B60Q 1/2665; B64D 47/02
USPC ......................................................... 362/470
See application file for complete search history.

(56) References Cited

U.S. PATENT DOCUMENTS

| 5,695,272 | A | * | 12/1997 | Snyder | B64D 47/02 362/231 |
|---|---|---|---|---|---|
| 6,076,948 | A | * | 6/2000 | Bukosky | B60Q 1/2665 340/475 |
| 6,441,943 | B1 | * | 8/2002 | Roberts | B60Q 1/2665 250/214 AL |
| 8,797,663 | B1 | * | 8/2014 | Bouckaert | F21V 13/08 359/889 |
| 2011/0227487 | A1 | * | 9/2011 | Nichol | G02B 6/0018 315/158 |
| 2014/0268631 | A1 | * | 9/2014 | Pickard | F21K 9/64 362/84 |

FOREIGN PATENT DOCUMENTS

| CA | 2466518 | 5/2003 |
|---|---|---|
| DE | 102008019118 | 10/2009 |
| DE | 102009008418 | 8/2010 |
| EP | 1152921 | 11/2001 |
| EP | 1372017 | 12/2003 |

(Continued)

OTHER PUBLICATIONS

EP Search Report for Application No. 13178586.7-1754. Mailed on Jan. 15, 2014. 5 pages.

*Primary Examiner* — Anabel Ton
(74) *Attorney, Agent, or Firm* — Cantor Colburn LLP

(57) ABSTRACT

An exterior aircraft light unit for emitting light of a first wavelength and light of a second wavelength, different from the first wavelength, with corresponding emission characteristics is disclosed. The exterior aircraft light unit has at least one first light source configured to emit the light of the first wavelength, at least one second light source configured to emit the light of the second wavelength, and a wavelength selective optical element, which wavelength selective optical element is reflective for the light of the first wavelength and transparent for the light of the second wavelength.

23 Claims, 2 Drawing Sheets

(56) References Cited

FOREIGN PATENT DOCUMENTS

| EP | 1835325 | 9/2007 |
|----|---------|--------|
| WO | 0049331 | 8/2000 |
| WO | 03039957 A1 | 5/2003 |

* cited by examiner

EXTERIOR AIRCRAFT LIGHT UNIT AND METHOD OF OPERATING AN EXTERIOR AIRCRAFT LIGHT UNIT

CROSS REFERENCE TO RELATED APPLICATIONS

This application claims priority to European Patent Application No. 13 178 586.7 filed Jul. 30, 2013, the entire contents of which is incorporated herein by reference.

FIELD OF TECHNOLOGY

The invention relates to lighting systems of aircraft. In particular, it relates to exterior aircraft light units, such as for example used in helicopters and air planes. More in particular, it relates to exterior aircraft light units that are capable of emitting light of different wavelengths.

BACKGROUND

Exterior aircraft light units are provided for a variety of purposes, such as for illumination, for signalling purposes, and for assessing the environment, for example in the course of landing and/or search maneuvers. Light units are known that emit light of different wavelengths. For example, it is known to provide search and landing lights that are capable of emitting visible light on the one hand and infrared light on the other hand. Other applications also call for two or more lighting modes with the emission of light of different wavelengths, due to particular application requirements and/or due to regulatory requirements. It may be desired to have corresponding emission characteristics of the light unit for the different wavelengths. Known light units therefore provide two optical structures, contained in one light unit. In particular, a first light source with a first wavelength is provided with one or more optical elements for shaping the emission characteristics of the first optical structure. A second light source with a second wavelength is provided with one or more optical elements for shaping the emission characteristics of the second optical structure. The optical elements are shaped and arranged in such a way that the two optical structures have corresponding emission characteristics. In the finished light unit, the two optical structures are placed adjacent to each other, usually in a common housing. The space requirements of such a light unit have been found to not be satisfactory.

Accordingly, it would be beneficial to provide an exterior aircraft light unit that has reduced space requirements. Further, it would be beneficial to provide a method of operating such an exterior aircraft light unit.

SUMMARY

Exemplary embodiments of the invention include an exterior aircraft light unit for emitting light of a first wavelength and light of a second wavelength, different from the first wavelength, with corresponding emission characteristics. The exterior aircraft light unit comprises at least one first light source configured to emit the light of the first wavelength, at least one second light source configured to emit the light of the second wavelength, and a wavelength selective optical element, which wavelength selective optical element is reflective for the light of the first wavelength and transparent for the light of the second wavelength. The at least one first light source, the at least one second light source and the wavelength selective optical element are arranged in such a way that both the light of the first wavelength and the light of the second wavelength hit the wavelength selective optical element, with the light of the first wavelength being reflected by the wavelength selective optical element and the light of the second wavelength being passed through by the wavelength selective optical element. The light of the at least one first light source, upon being reflected by the wavelength selective optical element, and the light of the at least one second light source, upon being passed through by the wavelength selective optical element, have corresponding directional characteristics.

In this way, it is made possible to have both the light source(s) of the first wavelength and the light source(s) of the second wavelength in one single optical structure. The wavelength selective optical element allows for combining the light paths of the first light source and the second light source in such a way that the light of the first wavelength and the light of the second wavelength have corresponding directional characteristics "downstream" of the wavelength selective optical element. When the light of the first wavelength is reflected at the wavelength selective optical element, its path is joined with the path of the light of the second wavelength coming from the other side of the wavelength selective optical element. It is apparent that the first light source(s) and the second light source(s), in operation, do not have to be in an on-state at the same point in time; above description compares the light paths in an abstract sense, potentially travelled by the light of the respective wavelengths at different points in time.

The integration of the light source(s) of the first wavelength and the light source(s) of the second wavelength into a single optical structure allows for a reduction of the space requirements of the light unit by about 50%, as compared to previous approaches. It is also possible to significantly reduce the weight of the light unit. By combining the light paths of the light from at least one first light source and the light from the at least one second light source and providing corresponding directional characteristics at this combination point, all optical elements "downstream" of this combination point only have to be provided once. This is particularly true for entirely reflective elements, which reflect both wavelengths in the same way. The inventive approach may therefore allow for the reduction the number of optical elements and may contribute to more efficient and less costly production of the light unit.

Previous approaches did not allow for the excellent trade-off between desired light emission characteristics and space requirements, as made possible by the invention. With the inventive approach, the light of the two different light sources hits the optical elements, which are provided close to the light sources due to the space constraints, at substantially the same angles, resulting in corresponding emission characteristics. The present invention allows for the light sources to be in different positions, which is necessarily the case due to their spacial extensions, without preventing the correspondence of the emission characteristics of the two wavelengths.

The term corresponding directional characteristics describes the light characteristics of the light of the first wavelength and the light of the second wavelength, when leaving the wavelength selective optical element. In case the light of the second wavelength passes through the wavelength selective optical element twice, which will be discussed below, the corresponding directional characteristics occur at the second leaving of the wavelength selective optical element. The term directional characteristics may refer to a variety of properties of the light. It may refer to the direction of the light beam, i.e. to the direction of a collimated beam or to the direction of the highest light intensity for a non-collimated beam. It may also refer to the directional light distribution as a whole. It may include the absolute light intensity, although this aspect plays a secondary role, as it is highly dependent on the power of the light source. In general, the term directional characteristics may refer to at least one directional property of the light distribution upon leaving the wavelength selective optical element. Examples are the direction of highest light intensity and/or relative light intensities at discrete solid angles and/or a continuous relative light intensity distribution. The term corresponding directional characteristics may refer to this at least one directional property of the light distribution being substantially the same between the light distribution of the light of the first wavelength and the light distribution of the light of the second wavelength. In other words, the directional characteristics may be substantially the same. The term substantially the same accounts for slight deviations in the at least one directional property, such as due to manufacturing tolerances. However, substantially the same means that the at least one property in question is more similar between the light of the first wavelength and the light of the second wavelength of the invention than in a case where the two light sources are placed adjacent to each other, emitting light towards the same optical element that is not wavelength selective. Such adjacent placing within the same optical structure does not result in corresponding directional characteristics in the sense of the present invention.

An example is given to illustrate that the term corresponding directional characteristics does not require identical light distributions. Requirements for helicopter landing lights exist that have the same principal light emission direction for infrared light and visible light. However, the field of coverage may differ between the infrared and visible light. For example, the visible light coverage may require an opening angle that is 10° larger than the opening angle for infrared light.

While the term corresponding directional characteristics describes the properties of the light upon leaving the wavelength selective optical element, the term corresponding emission characteristics describes the properties of the light upon leaving the exterior aircraft light unit. While the directional characteristics may be the same as the emission characteristics, they may also be different, for example when further optical elements, such as lenses, mirrors, housings, etc., are provided between the wavelength selective optical element and the outside of the exterior aircraft light unit. Again, it is pointed out that the light of the second wavelength may pass through the wavelength selective optical element multiple times, with the term directional characteristics referring to the light after the last pass.

In general, the exterior aircraft light unit may comprise a multi-element light conditioning structure for shaping the light of the first light source and the light of the second light source to have corresponding directional characteristics, which multi-element light conditioning structure comprises the at least one first light source, the at least one second light source and the wavelength selective optical element. The multi-element light conditioning structure may have further optical elements or may consist only of the at least one first light source, the at least one second light source and the wavelength selective optical element. Particular embodiments with further optical elements will be described below.

The exterior aircraft light unit allows for at least two lighting modes. In a first lighting mode, light of the first wavelength is emitted. In a second lighting mode, light of the second wavelength is emitted. It is also possible that both light of the first wavelength and light of the second wavelength are emitted at the same time. With the light of the first wavelength and the light of the second wavelength having corresponding characteristics, the light unit may be used with different wavelengths without modifications by the control during operation.

The term first wavelength may refer to one particular wavelength or to a set wavelength range. Equally, the term second wavelength may refer to one particular wavelength or to a set wavelength range. In other words, the first and second light source(s) do not have to be single wavelength light sources. It is possible that one or both of the first and second light source(s) emit radiation of frequency ranges. The first wavelength being different from the second wavelength therefore means that no wavelengths emitted by the first light source(s) are emitted by the second light source(s) and vice versa, at least not to a significant extent.

The term reflective may refer to the property of reflecting substantially all of the light irradiated onto the wavelength selective optical element with the respective wavelength. The term transparent may refer to the property of passing through substantially all of the light irradiated onto the wavelength selective optical element with the respective wavelength.

The at least one first light source may be exactly one first light source or a plurality of first light sources. Equally, the at least one second light source may be exactly one second light source or a plurality of second light sources. All combinations between one or more first light source on the one hand and one or more second light sources on the other hand are possible as well.

According to a further embodiment, the first wavelength is in the visible light range and the second wavelength is in the infrared range. The wavelength selective optical element reflects the light of the visible light range and is transparent for the light in the infrared range. In this case, the wavelength selective optical element is also referred to as cold mirror. This term stems from the fact that infrared light transfers more heat than visible light. Accordingly, with the "colder" visible light being reflected, the wavelength selective optical element may illustratively be called "cold mirror". Such cold mirrors are per se known. They may be a particular form of dielectric mirrors. Other optical elements are also per se known that reflect light of a first wavelength, but pass light of a second wavelength. A particular example are hot mirrors that are transparent for visible light, but reflective for infrared light. Such hot mirrors are also applicable to the present invention.

In this way, the exterior aircraft light unit may be used for illumination with visible light on the one hand and for "illumination" with infrared light on the other hand. Emission of infrared light may be desired in situations where the aircraft's exterior lights are not supposed to be seen with the human eye or where infrared light is reflected better by the environment or for other reasons.

Visible light is commonly defined to be light of wavelengths between 380 and 780 nm. Infrared light is commonly defined to be the light of wavelengths between 780 nm and 1 mm. In a particular embodiment, the wavelength selective optical element may have a transition region between reflective and transparent properties. For example, the wavelength selective optical element may be reflective for light of 780 nm and less, while it may be transparent for light of 850 nm and more. Somewhere between 780 nm and 850 nm, the wavelength selective optical element gradually changes from being reflective to being transparent. In such an embodiment, the second wavelength may be above 850 nm.

It is explicitly pointed out, however, that the first and the second wavelengths may also be different wavelengths in other light ranges. For example, it is possible that both the first wavelength and the second wavelength are in the visible light range, but comprise different colors.

According to a further embodiment, the light of the first wavelength and the light of the second wavelength, when emitted from the exterior aircraft light unit, is a substantially collimated beam. In other words, the corresponding emission characteristics of the exterior aircraft light unit are a substantially collimated beam. The term substantially collimated beam refers to the fact that it is technically not possible to produce an ideal collimated beam. The substantially collimated beam refers to the light rays of the light beam being highly collinear and hardly dispersing with distance. In a particular embodiment, the corresponding directional characteristics may be a substantially collimated beam as well. In this case, no element with a significant impact on the collimated beam is provided between the wavelength selective optical element and the outside of the light unit. In particular, it is possible that only a housing is present between the wavelength selective optical element and the outside of the light unit, which housing has no significant refractive impact on the collimated beam.

It is explicitly pointed out that the invention does not require the emitted light to be a collimated beam. Exemplary regulations require an opening angle of about 30° of the emitted light beam. Such and other embodiments are equally possible in the inventive framework.

According to a further embodiment, the at least one first light source and the at least one second light source are positioned on opposite sides of the wavelength selective optical element. In this way, the light of the at least one first light source is reflected by the wavelength selective optical element and stays on the side of the at least one first light source, while the light of the at least one second light source passes through the wavelength selective optical element and therewith reaches the side of the wavelength selective optical element where the at least one first light source is positioned. In this embodiment, the light of the second wavelength may pass the wavelength selective optical element once. In this way, a lot of freedom may be given to the designer for placing the at least one second light source, potentially in combination with other optical elements, at suitable positions on the back side of the wavelength selective optical element (when seen from the at least one first light source).

According to a further embodiment, the wavelength selective optical element is plane, oriented substantially orthogonal to a connection line between the at least one first light source and the at least one second light source. In this way, an easily manufacturable plane wavelength selective optical element allows for combining the paths of the light from the first light source(s) and the light from the second light source(s). In a particular embodiment, all optical elements downstream of the wavelength selective optical element are non-wavelength-selective with respect to the first and second wavelengths. In this way, the provision of one easily-manufacturable wavelength selective optical element is sufficient for providing corresponding emission characteristics of the light unit for the first and second wavelengths.

According to a particular embodiment, the plane wavelength selective optical element may be arranged on the connection line between exactly one first light source and exactly one second light source. It may in particular be arranged in the middle of the connection line between the first light source(s) and the second light source(s). However, the positioning of the wavelength selective optical element may depend on the geometry, extension and inherent emission properties of the first light source(s) and second light source(s).

According to a further particular embodiment, where the at least one first light source and the at least one second light source are positioned on opposite sides of the wavelength selective optical element, the exterior aircraft light unit further comprises at least one additional optical element, disposed on a side of the wavelength selective optical element where the at least one first light source is positioned, the at least one additional optical element being configured to equally affect the light of the first wavelength as well as of the light of the second wavelength. The at least one additional optical element may be reflective for both wavelengths or transparent for both wavelengths. According to a particular embodiment, the at least one additional optical element comprises a reflector, in particular a parabolic reflector or spherical reflector or reflector consisting of multiple spherical portions. The at least one additional optical element may also comprise a lens. The at least one additional optical element may be provided for shaping the desired output distribution of the light unit.

According to a further embodiment, where the at least one first light source and the at least one second light source are positioned on opposite sides of the wavelength selective optical element, the exterior aircraft light unit further comprises at least one additional optical element, disposed on a side of the wavelength selective optical element where the at least one second light source is positioned, wherein the wavelength selective optical element is shaped to give the light of the first wavelength the corresponding directional characteristics and wherein the at least one additional optical element is shaped to give the light of the second wavelength the corresponding directional characteristics. In this way, the shaping of the corresponding directional characteristics is split between the at least one additional optical element for the light of the second wavelength and the wavelength selective optical element for the light of the first wavelength. This embodiment allows for the side of the first light source(s), which is the emission side of the light unit, to have a minimum number of components. In this way, the light path from the wavelength selective optical element to the outside may be maximally unobstructed. In particular, the wavelength selective optical element may be parabolic or spherical or consist of multiple spherical portions. Also, the additional optical element(s) may be parabolic or spherical or consist of multiple spherical portions. The at least one additional optical element may be a reflective optical element. Further, the at least one additional optical element may be exactly one additional optical element.

According to a further embodiment, the at least one second light source is a plurality of n second light sources and the at least one additional optical element is a plurality of n additional optical elements, with n≥2, with each of the plurality of n additional optical elements being provided for shaping the light of a respective second light source. In this way, the light of each light source may be given the desired directional properties. For example, it is possible to make the light from each of the plurality of second light sources a substantially collimated beam. Those collimated beams then pass through the wavelength selective optical element in a substantially straight fashion.

According to a further embodiment, the at least one first light source and the at least one second light source are positioned on the same side of the wavelength selective optical element. This arrangement allows for positioning the light sources close to each other, in particular, adjacent to each other, which allows for the provision of electrical power and the provision of control circuitry to be highly integrated.

According to a further embodiment, where the at least one first light source and the at least one second light source are positioned on the same side of the wavelength selective optical element, the exterior aircraft light unit further comprises at least one additional optical element, disposed on a side of the wavelength selective optical element where the at least one first light source and the at least one second light source are not positioned, wherein the wavelength selective optical element is shaped to give the light of the first wavelength the corresponding directional characteristics and wherein the at least one additional optical element is shaped to give the light of the second wavelength the corresponding directional characteristics. In this way, the wavelength selective optical element and the at least one additional optical element may be arranged in a stacked manner, leading to high integration and low space requirements. The light of the second light source(s) passes through the wavelength selective optical element, is shaped at the at least one additional optical element and passes through the wavelength selective optical element again. The at least one additional optical element may be a reflective optical element. Further, the at least one additional optical element may be exactly one additional optical element.

According to a particular embodiment, the wavelength selective optical element and the additional optical element, which may be a reflective optical element, may have the same shape. According to a further particular embodiment, the first light source(s) and the second light source(s) may be offset with respect to each other. It is further possible that the wavelength selective optical element and the additional optical element are also offset with respect to each other. Their offset may be adapted to the offset between the first light source(s) and the second light source(s).

According to a further embodiment, the wavelength selective optical element has one of a parabolic shape and a spherical shape. It is also possible that the at least one additional optical element has one of a parabolic shape and a spherical shape. It is further possible that the wavelength selective optical element and/or the additional optical element(s) have multiple spherical portions. Parabolic shapes, spherical shapes and shapes with multiple spherical portions are suitable choices for achieving desired directional characteristics, in particular for achieving collimated or near-collimated beams.

According to a further embodiment, the exterior aircraft light unit is adapted to be one of a fixed position light and a movable search and/or landing light. In any case, the exterior aircraft light unit requires little space and weight, while providing corresponding emission characteristics for light of different wavelengths, stemming from different light sources. This is aerodynamically beneficial both for fixed lights and movable lights. Since the light unit is small and light, the force for moving a movable light unit is reduced, resulting in smaller motors and gears and therefore in further weight savings.

According to a further embodiment, each of the at least one first light source and the at least one second light source is an LED. By providing LED's, high illumination for low electric power is provided. Moreover, the LED's themselves do not require much space. LED's are particularly suitable for visible light. Solid state infrared emitters may be used as infrared light sources.

Exemplary embodiments of the invention further include an aircraft, such as an air plane or a helicopter, comprising at least one exterior aircraft light unit, as described in any of the embodiments above. Above modifications and advantages equally relate to the aircraft.

Exemplary embodiments of the invention further include a method of operating an exterior aircraft light unit, as described in any of the embodiments above, the method comprising the steps of controlling the at least one first light source to emit light of the first wavelength, resulting in the exterior aircraft light unit emitting light of the first wavelength with first emission characteristics, and controlling the at least one second light source to emit light of the second wavelength, resulting in the exterior aircraft light unit emitting light of the second wavelength with second emission characteristics, corresponding to the first emission characteristics. In this way, light emission of different wavelengths with corresponding emission characteristics can be performed.

BRIEF DESCRIPTION OF THE DRAWINGS

Embodiments of the invention are described in greater detail below with reference to the figures, wherein.

DETAILED DESCRIPTION

Figure 1:
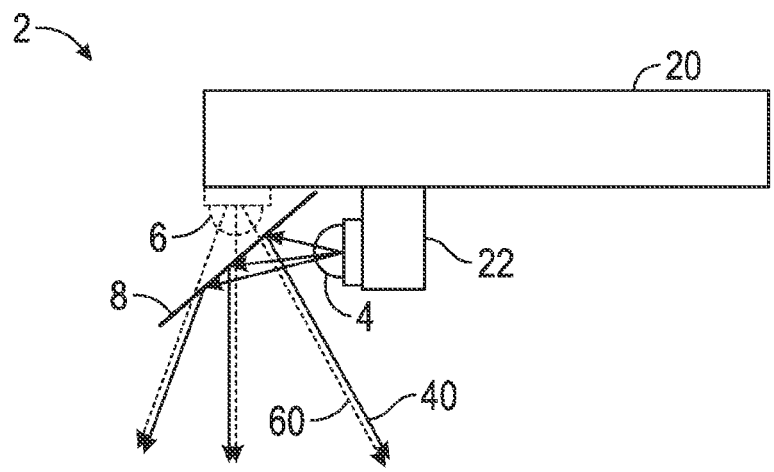
FIG. 1 shows a functional drawing of a first exemplary embodiment of an exterior aircraft light unit in accordance with the invention.

FIG. 1 shows a cross-section through an exterior aircraft light unit 2 in accordance with an exemplary embodiment of the invention. In particular, FIG. 1 shows only those elements of the light unit 2 that are relevant to the present invention. Other elements, such as a mounting plate, an at least partially transparent housing, power supply means and circuitry as well as control circuitry, are omitted from FIG. 1 and the other figures for a clearer illustration of the invention.

The light unit 2 comprises a first light source 4, which is an LED, a second light source 6, which is also an LED, a wavelength selective optical element 8, a mounting arm 20, and a supplementary mounting structure 22. The mounting arm 20 is shown to be the top portion of the light unit 2 in the drawing plane of FIG. 1. However, when mounted to the exterior of an aircraft, the mounting arm is positioned adjacent to the aircraft body.

The second light source 6 is mounted to the distal end of the mounting arm 20. The term distal end refers to the end of the mounting arm that is farthest removed from the electrical connections that run through the mounting arm 20 to the inside of the aircraft. The second light source 6 has its principle emission direction towards the bottom in the drawing plane of FIG. 1, i.e. away from the aircraft body, when mounted on the aircraft. The light emitted by the second light source 6 is shown in dashed lines and denoted with reference numeral 60.

The supplementary mounting structure 22 is attached to the mounting arm 20, somewhat removed from the distal end of the mounting arm 20. The supplementary mounting structure 22 also extends away from the mounting arm 20 towards the bottom in the drawing plane of FIG. 1. The first light source 4 is mounted to the supplementary mounting structure, with the principle light emission direction being towards the left in the drawing plane of FIG. 1. The light emitted by the first light source 4 is shown in solid lines and denoted with reference numeral 40.

While some rays of the light of the first wavelength 40 and of the light of the second wavelength 60 are shown for illustrative purposes, it is pointed out that the first and second light sources 4, 6 have continuous light distributions, both in the drawing plane as well as in three dimensions.

The first light source 4 emits visible light, while the second light source 6 emits infrared light. The light emitted by the first light source 4 may be light of a single wavelength or may be light of a plurality of wavelengths in the visible light range, such as white light. Equally, the light of the second light source may be light of a single wavelength or may be light of a plurality of wavelengths, such as a particular wavelength range within the infrared spectrum.

The wavelength selective optical element 8 is disposed between the first light source 4 and the second light source 6. The wavelength selective optical element 8 is a plane structure, which is shown as a line in the cross-section of FIG. 1. The wavelength selective optical element is arranged at an angle of 45° with respect to the mounting arm 20. The wavelength selective optical element 8 is reflective for light from the first light source 4, i.e. for light of the first wavelength, while it is transparent for light from the second light source 6, i.e. light of the second wavelength.

The operation of the light unit 2 is described as follows. In a first mode of operation, the first light source 4 is controlled to be turned on and emits light of the first wavelength 40. The emitted light of the first wavelength 40 is reflected by the wavelength selective optical element 8 towards the bottom in the drawing plane of FIG. 1, which is the main emission direction of the light unit 2, when mounted to the aircraft body. In a second mode of operation the second light source 6 is controlled to be turned on and emits light of the second wavelength 60. The light of the second wavelength 60 hits the wavelength selective optical element 8 and passes therethrough. When leaving the wavelength selective optical element, the light of the first wavelength 40 and the light of the second wavelength 60 have the same principle direction of emission, namely to the bottom in the drawing plane of FIG. 1, and the same light emission in directions outside of the principle emission direction.

It is pointed out that the wavelength selective optical element 8 is oriented in such a way that the light of the first wavelength 40 and the light of the second wavelength 60 have corresponding directional characteristics after their reflection/passing of the wavelength selective optical element 8. If the first light source 4 and the second light source 6 were ideal point light sources with identical light intensity distributions, then arranging of the wavelength selective optical element 8 in the middle and orthogonal to a connection line between the first light source 4 and the second light source 6 would result in exactly corresponding directional characteristics.

Figure 2:
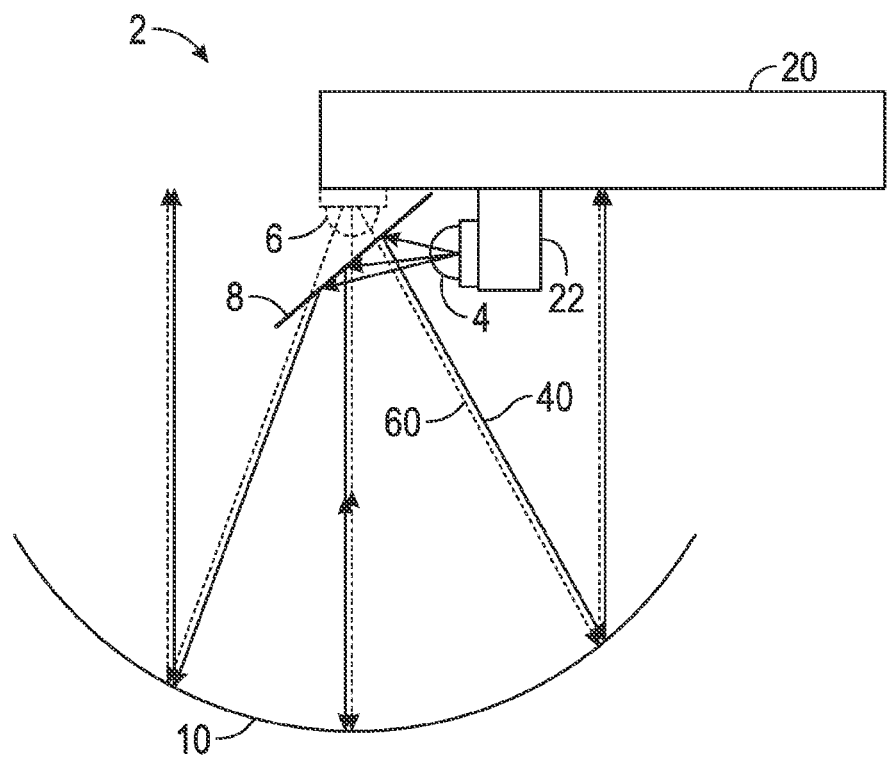
FIG. 2 shows a functional drawing of a second exemplary embodiment of an exterior aircraft light unit in accordance with the invention.

FIG. 2 shows a cross-section through an exterior aircraft light unit 2 in accordance with a second exemplary embodiment of the invention. The light unit 2 of FIG. 2 is very similar to the light unit 2 of FIG. 1. In fact, there is only one difference between the two light units. The light unit 2 of FIG. 2 comprises an additional optical element 10, which is a parabolic reflector. The parabolic reflector is a three-dimensional, rotation-symmetric structure, a curved line of which is shown in the cross-section of FIG. 2. When being reflected from the wavelength selective optical element 8, the light of the first wavelength 40 hits the parabolic reflector 10 and is transformed into a collimated beam, which is emitted towards the top in the drawing plane of FIG. 2. Equally, the light of the second wavelength 60, when passed through the wavelength selective optical element 8, hits the parabolic reflector 10 and is transformed into a collimated beam in the same direction.

As can be seen, the emission direction of the light unit 2 is towards the top in the drawing plane of FIG. 2. Accordingly, when mounted to the aircraft body, the light unit 2 is mounted to the aircraft body with the parabolic reflector 10 being close to the helicopter body, potentially mounted on a separate mounting plate before being applied to the aircraft body.

This in turn means that the light of the first and second wavelength, before being emitted from the light unit 2 through an at least partially transparent housing (not shown), passes the mounting arm 20, the supplementary mounting structure 22, the first light source 4 and the second light source 6. In order for the emitted light to be least obstructed by those elements, the mounting arm 20 and the supplementary mounting structure 22 are dimensioned as small as possible. For example, the width of the mounting arm 20 and of the supplementary mounting structure 22, i.e. the extension orthogonal to the drawing plane of FIG. 2, is kept to a minimum. In order to be broad enough to carry the LEDs and to supply them with electrical energy, the width may be in a range of 5-8 mm, in particular in a range of 6-7 mm.

The corresponding emission characteristics of the light of the first wavelength 40 and the light of the second wavelength 60 are a collimated beam. Accordingly, the parabolic reflector 10 transforms the corresponding directional characteristics of the light of the first wavelength 40 and the light of the second wavelength 60, which are the inherent light distributions of the first light source 4 and the second light source 6 with the same orientation, into the corresponding emission characteristics, which are a collimated beam.

Figure 3:
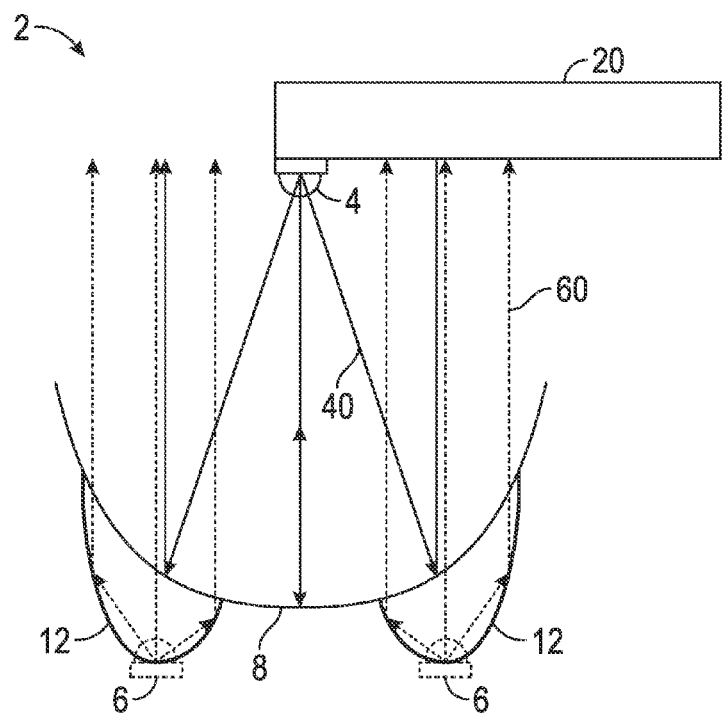
FIG. 3 shows a functional drawing of a third exemplary embodiment of an exterior aircraft light unit in accordance with the invention.

FIG. 3 shows a cross-section through an exterior aircraft light unit 2 in accordance with a third exemplary embodiment of the invention. The light unit 2 has a mounting arm 20, a first light source 4, a parabolic wavelength selective optical element 8, also referred to as parabolic cold mirror 8, two second light sources 6, and two additional optical elements 12, also referred to as parabolic reflectors 12. As compared to FIGS. 1 and 2, like elements are denoted with like reference numerals. There structure and functioning is not described again in order to avoid repetitions. However, the wavelength selective optical element 8 has a different shape and functionality, which will be described in detail below.

The first light unit 4 is mounted to the distal end of the mounting arm 20. It emits light of the first wavelength, which is denoted with reference numeral 40 and shown in solid lines. The light of the first wavelength 40 hits the parabolic cold mirror 8, which reflects the light of the first wavelength and makes it a collimated beam, directed towards the top in the drawing plane of FIG. 3. For this purpose, the parabolic cold mirror 8 is a three-dimensional, rotation-symmetric structure.

The top of the drawing plane is also the emission direction of the light unit 2 of the embodiment of FIG. 3. Accordingly, the emission direction and the orientation of the light unit with respect to the aircraft body is like in FIG. 2. Above explanations in this respect are not repeated for brevity.

The two light sources 6 are arranged below the parabolic cold mirror 8, i.e. on the other side of the parabolic cold mirror 8 as compared to the first light source 4. Further, two additional optical elements 12, which are three-dimensional parabolic reflectors 12, are provided, each of which is associated with one of the two second light sources 6. The parabolic reflectors 12 are arranged around the second light sources 6 in such a way that they transform the inherent light emission distribution of the second light sources 6 into respective collimated beams. These beams are directed upwards in the drawing plane of FIG. 3 as well. Accordingly, the light of the second wavelength, which is illustrated in dashed lines and denoted with reference numeral 60, hits the parabolic cold mirror 8 from the bottom in a collimated beam. As the parabolic cold mirror 8 is transparent for the light of the second wavelength 60, the collimated beams of the two second light sources 6 pass through the parabolic cold mirror 8 virtually unaffected and exit the light unit 2 as collimated beams in the same direction as the collimated beam of the first light source 4.

This embodiment is different from the embodiment of FIG. 2 in that the wavelength selective optical element 8 transforms the light intensity distribution of the first light source by collimating the same, instead of being just a plane mirror.

While the parabolic cold mirror 8 shapes the emission characteristics of the light of the first frequency wavelength 40, the parabolic reflectors 12 shape the emission characteristics of the light of the second wavelength 60. It is pointed out that both the light of the first wavelength 40 and the light of the second wavelength 60 leave the wavelength selective optical element 8 with corresponding directional characteristics, which are equal to the corresponding emission characteristics when leaving the light unit 2.

Figure 4:
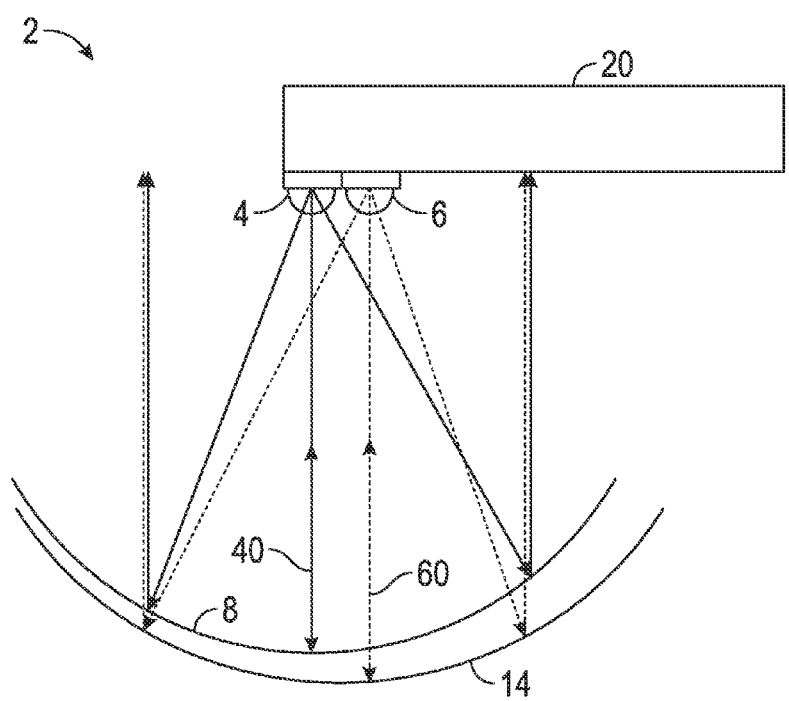
FIG. 4 shows a functional drawing of a fourth exemplary embodiment of an exterior aircraft light unit in accordance with the invention.

FIG. 4 shows a cross-section through an exterior aircraft light unit 2 in accordance with a fourth exemplary embodiment of the invention. The light unit 2 of FIG. 4 is fairly similar to the light unit 2 of FIG. 3, with like reference numerals denoting like elements. In particular, the mounting arm 20, the first light source 4 and the wavelength selective optical element 8 of FIG. 4 are identical to those elements in FIG. 3. A description of these elements is therefore omitted for brevity. However, the light unit 2 of FIG. 4 does not have second light sources on the "back side" of the wavelength selective optical element 8, as has the light unit 2 of FIG. 3. Accordingly, there are also no parabolic reflectors 12 for shaping the light of the second light sources upon emission from the light sources.

Instead, the light unit 2 comprises a second light source 6 that is mounted to the mounting arm 20. It is positioned adjacent to the first light source 4. Further, the light unit 2 of FIG. 4 comprises a parabolic reflector 14. This parabolic reflector 14 is provided on a side of the wavelength selective optical element 8 where the first light source 6 and the second light source 6 are not positioned. In other words, the parabolic reflector 14 is on the back side of the wavelength selective optical element 8, when seen from the first light source 4 and the second light source 6. The shape of the parabolic reflector 14 is equal to the shape of the parabolic wavelength selective optical element 8. It is offset to the side in the same manner as the second light source 6 is offset with respect to the first light source 4.

The light of the second wavelength 60 is emitted by the second light source 6, passed through the wavelength selective optical element 8, reflected by the parabolic reflector 14 and brought into the shape of a collimated beam. It is then passed through the wavelength selective optical element 8 again. In this way, the light of the second wavelength 60 leaves the wavelength selective optical element 8 as a collimated beam, equal to the light of the first wavelength 40 after reflection. Accordingly, the two light sources 4, 6 may be arranged in a very convenient manner next to each other, while the stacking of the wavelength selective optical element 8 and the parabolic reflector 14 allows for a highly integrated and space-efficient design.

It is pointed out that all of the optical elements described above as being parabolic may also have different shapes. Their shapes depend on the desired emission characteristics of the light unit. Instead of being parabolic, the optical elements may also be spherical or may consist of multiple spherical portions, as such structures are also suitable for effecting near-collimated beams. The invention is equally applicable to scenarios where particular emission characteristics are desired that do not require any collimation of the light.

It is further pointed out that the embodiments of FIGS. 2-4 also have two operational modes, as described above with respect to FIG. 1. All of the embodiments may emit the light of the first wavelength and the light of the second wavelength at the same time as well.

It is further pointed out that the Figs. are schematic only and not to scale. The drawings are intended to illustrate the working principles and are in particular not intended to be a correct representation of all input and output angles of the depicted light rays.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiments disclosed, but that the invention will include all embodiments falling within the scope of the appended claims.

The invention claimed is:

1. An exterior aircraft light unit for emitting light of a first wavelength and light of a second wavelength, different from the first wavelength, with corresponding emission characteristics, the exterior aircraft light unit comprising:

at least one first light source configured to emit the light of the first wavelength, at least one second light source configured to emit the light of the second wavelength, and a wavelength selective optical element, which wavelength selective optical element is reflective for the light of the first wavelength and transparent for the light of the second wavelength, wherein the at least one first light source, the at least one second light source and the wavelength selective optical element are arranged in such a way that both the light of the first wavelength and the light of the second wavelength hit the wavelength selective optical element, with the light of the first wavelength being reflected by the wavelength selective optical element and the light of the second wavelength being passed through by the wavelength selective optical element, and with the light of the at least one first light source, upon being reflected by the wavelength selective optical element, and the light of the at least one second light source, upon being passed through by the wavelength selective optical element, having corresponding directional characteristics, wherein the at least one first light source and the at least one second light source are positioned on the same side of the wavelength selective optical element, and wherein the exterior aircraft light unit further comprises at least one additional optical element, disposed on a side of the wavelength selective optical element where the at least one first light source and the at least one second light source are not positioned, wherein the wavelength selective optical element is shaped to give the light of the first wavelength the corresponding directional characteristics and wherein the at least one additional optical element is shaped to give the light of the second wavelength the corresponding directional characteristics.

2. The Exterior aircraft light unit according to claim 1, wherein the first wavelength is in the visible light range and wherein the second wavelength is in the infrared range.

3. The Exterior aircraft light unit according to claim 1, wherein the light of the first wavelength and the light of the second wavelength, when emitted from the exterior aircraft light unit, is a substantially collimated beam.

4. The Exterior aircraft light unit according to claim 1, wherein the wavelength selective optical element has one of a parabolic shape and a spherical shape and wherein the at least one additional optical element has one of a parabolic shape and a spherical shape.

5. The Exterior aircraft light unit according to claim 1, adapted to be one of a fixed position light and a movable search and/or landing light.

6. The Exterior aircraft light unit according to claim 1, wherein each of the at least one first light source and the at least one second light source is an LED.

7. The Aircraft, such as an air plane or a helicopter, comprising at least one exterior aircraft light unit according to claim 1.

8. The Method of operating an exterior aircraft light unit to claim 1, comprising the steps of:
controlling the at least one first light source to emit light of the first wavelength, resulting in the exterior aircraft light unit emitting light of the first wavelength with first emission characteristics, and
controlling the at least one second light source to emit light of the second wavelength, resulting in the exterior aircraft light unit emitting light of the second wavelength with second emission characteristics, corresponding to the first emission characteristics.

9. An exterior aircraft light unit for emitting light of a first wavelength and light of a second wavelength, different from the first wavelength, with corresponding emission characteristics, the exterior aircraft light unit comprising:
at least one first light source configured to emit the light of the first wavelength,
at least one second light source configured to emit the light of the second wavelength, and
a wavelength selective optical element, which wavelength selective optical element is reflective for the light of the first wavelength and transparent for the light of the second wavelength,
wherein the at least one first light source, the at least one second light source and the wavelength selective optical element are arranged in such a way that both the light of the first wavelength and the light of the second wavelength hit the wavelength selective optical element, with the light of the first wavelength being reflected by the wavelength selective optical element and the light of the second wavelength being passed through by the wavelength selective optical element, and with the light of the at least one first light source, upon being reflected by the wavelength selective optical element, and the light of the at least one second light source, upon being passed through by the wavelength selective optical element, having corresponding directional characteristics, wherein the at least one first light source and the at least one second light source are positioned on opposite sides of the wavelength selective optical element, wherein the wavelength selective optical element is plane, oriented substantially orthogonal to a connection line between the at least one first light source and the at least one second light source, and wherein the exterior aircraft light unit further comprises at least one additional optical element, disposed on a side of the wavelength selective optical element where the at least one first light source is positioned, the at least one additional optical element being one of a parabolic reflector and a spherical reflector and being configured to equally affect the light of the first wavelength as well as of the light of the second wavelength.

10. The Exterior aircraft light unit according to claim 9, wherein the first wavelength is in the visible light range and wherein the second wavelength is in the infrared range.

11. The Exterior aircraft light unit according to claim 9, wherein the light of the first wavelength and the light of the second wavelength, when emitted from the exterior aircraft light unit, is a substantially collimated beam.

12. The Exterior aircraft light unit according to claim 9, adapted to be one of a fixed position light and a movable search and/or landing light.

13. The Exterior aircraft light unit according to claim 9, wherein each of the at least one first light source and the at least one second light source is an LED.

14. The Aircraft, such as an air plane or a helicopter, comprising at least one exterior aircraft light unit according to claim 9.

15. The Method of operating an exterior aircraft light unit to claim 9, comprising the steps of:
controlling the at least one first light source to emit light of the first wavelength, resulting in the exterior aircraft light unit emitting light of the first wavelength with first emission characteristics, and
controlling the at least one second light source to emit light of the second wavelength, resulting in the exterior aircraft light unit emitting light of the second wavelength with second emission characteristics, corresponding to the first emission characteristics.

16. An exterior aircraft light unit for emitting light of a first wavelength and light of a second wavelength, different from the first wavelength, with corresponding emission characteristics, the exterior aircraft light unit comprising:
at least one first light source configured to emit the light of the first wavelength,
at least one second light source configured to emit the light of the second wavelength, and
a wavelength selective optical element, which wavelength selective optical element is reflective for the light of the first wavelength and transparent for the light of the second wavelength, wherein the at least one first light source, the at least one second light source and the wavelength selective optical element are arranged in such a way that both the light of the first wavelength and the light of the second wavelength hit the wavelength selective optical element, with the light of the first wavelength being reflected by the wavelength selective optical element and the light of the second wavelength being passed through by the wavelength selective optical element, and with the light of the at least one first light source, upon being reflected by the wavelength selective optical element, and the light of the at least one second light source, upon being passed through by the wavelength selective optical element, having corresponding directional characteristics, wherein the at least one first light source and the at least one second light source are positioned on opposite sides of the wavelength selective optical element, and wherein the exterior aircraft light unit further comprises at least one additional optical element, disposed on a side of the wavelength selective optical element where the at least one second light source is positioned, wherein the wavelength selective optical element is shaped to give the light of the first wavelength the corresponding directional characteristics and wherein the at least one additional optical element is shaped to give the light of the second wavelength the corresponding directional characteristics, and wherein the wavelength selective optical element has one of a parabolic shape and a spherical shape and wherein the at least one additional optical element is a reflective optical element and has one of a parabolic shape and a spherical shape.

17. The Exterior aircraft light unit according to claim 16, wherein the at least one second light source is a plurality of n second light sources and wherein the at least one additional optical element is a plurality of n additional optical elements, with n☐2, with each of the plurality of n additional optical elements being provided for shaping the light of a respective second light source.

18. The Exterior aircraft light unit according to claim 16, wherein the first wavelength is in the visible light range and wherein the second wavelength is in the infrared range.

19. The Exterior aircraft light unit according to claim 16, wherein the light of the first wavelength and the light of the second wavelength, when emitted from the exterior aircraft light unit, is a substantially collimated beam.

20. The Exterior aircraft light unit according to claim 16, adapted to be one of a fixed position light and a movable search and/or landing light.

21. The Exterior aircraft light unit according to claim 16, wherein each of the at least one first light source and the at least one second light source is an LED.

22. The Aircraft, such as an air plane or a helicopter, comprising at least one exterior aircraft light unit according to claim 16.

23. The Method of operating an exterior aircraft light unit to claim 16, comprising the steps of:
   controlling the at least one first light source to emit light of the first wavelength, resulting in the exterior aircraft light unit emitting light of the first wavelength with first emission characteristics, and
   controlling the at least one second light source to emit light of the second wavelength, resulting in the exterior aircraft light unit emitting light of the second wavelength with second emission characteristics, corresponding to the first emission characteristics.

* * * * *